US012195273B2

(12) United States Patent
O'Malley

(10) Patent No.: US 12,195,273 B2
(45) Date of Patent: Jan. 14, 2025

(54) METHOD AND APPARATUS FOR INCREASING THE VOLUME OF MATERIALS TRANSPORTED IN A SHIPPING CONTAINER, TRUCK, AND/OR SEMI TRAILER

(71) Applicant: Maribeth O'Malley, LaGrange Park, IL (US)

(72) Inventor: Maribeth O'Malley, LaGrange Park, IL (US)

( * ) Notice: Subject to any disclaimer, the term of this patent is extended or adjusted under 35 U.S.C. 154(b) by 836 days.

(21) Appl. No.: 17/392,200

(22) Filed: Aug. 2, 2021

(65) Prior Publication Data

US 2022/0063903 A1   Mar. 3, 2022

Related U.S. Application Data

(60) Provisional application No. 63/074,387, filed on Sep. 3, 2020.

(51) Int. Cl.
*B65D 90/00* (2006.01)
*B65D 88/12* (2006.01)

(52) U.S. Cl.
CPC ....... *B65D 90/0073* (2013.01); *B65D 88/121* (2013.01); *B65D 2590/005* (2013.01); *B65D 2590/0066* (2013.01)

(58) Field of Classification Search
CPC .............. B65D 90/0073; B65D 88/121; B65D 2590/005; B65D 2590/0066; B60N 3/001; A47B 43/00; B60R 5/003
USPC .......................................................... 410/2
See application file for complete search history.

(56) References Cited

U.S. PATENT DOCUMENTS

| 2,210,762 | A | * | 8/1940 | Itzigson | ................. | B60J 3/0204 16/358 |
| 2,217,688 | A | * | 10/1940 | Larson | .................... | B60R 5/003 D12/44 |
| 4,067,263 | A | | 1/1978 | Naffa et al. | | |
| 4,252,482 | A | * | 2/1981 | Naves | ...................... | B61D 3/04 404/1 |
| 4,934,645 | A | * | 6/1990 | Breslow | ................. | A47B 96/07 248/242 |

(Continued)

FOREIGN PATENT DOCUMENTS

| DE | 10057577 A1 * | 10/2001 | ............ B60P 7/0815 |
| DE | 20304146 U1 * | 9/2004 | ................ B60P 7/12 |

(Continued)

*Primary Examiner* — Hilary L Gutman
(74) *Attorney, Agent, or Firm* — GrowIP Law Group LLC

(57) ABSTRACT

A beam, systems, and methods for increasing the use of cargo volume in a shipping container. An example beam is configured to be removably coupled to a track having a plurality of openings and coupled to a sidewall of a shipping container and thereby cantilevered to support cargo therein. The beam includes a housing extending between a first and second end. A bracket is coupled to the second end of the beam. And a connector coupled is to the beam's second end and arranged above the bracket. The connector has an engagement notch to engage with a first edge of a first opening in the track and has a latching tab configured to extend through the first opening adjacent to a second edge of the first opening. The connector is coupled to a latch having a spring-biased blocking plate configured to move from a first position to a second position.

20 Claims, 16 Drawing Sheets

(56) References Cited

U.S. PATENT DOCUMENTS

| | | |
|---|---|---|
| 5,338,137 A | 8/1994 | Jensen |
| 5,807,047 A | 9/1998 | Cox |
| 6,074,143 A | 6/2000 | Langston et al. |
| 6,824,341 B2 | 11/2004 | Ehrlich |
| 6,895,867 B1 | 5/2005 | Burrows |
| 7,134,820 B2 | 11/2006 | Ehrlich |
| 8,172,494 B1 | 5/2012 | Knox |
| 8,740,526 B2 | 6/2014 | Knox |
| 10,518,822 B2 | 12/2019 | Kauffman |
| 2008/0166199 A1* | 7/2008 | Halliar ............... B60P 7/14 410/94 |
| 2016/0159269 A1* | 6/2016 | Squyres ............... B60P 7/15 410/143 |
| 2017/0217348 A1* | 8/2017 | Paunov ............... A47B 43/00 |
| 2018/0050630 A1* | 2/2018 | Kauffman ......... B65D 90/0053 |
| 2019/0254422 A1* | 8/2019 | Beere ............... A47B 96/07 |
| 2021/0153645 A1* | 5/2021 | Beere ............... B60N 3/002 |
| 2023/0339407 A1* | 10/2023 | Gerez ............... B60R 5/003 |

FOREIGN PATENT DOCUMENTS

| | | | |
|---|---|---|---|
| DE | 102021117292 A1 * | 1/2023 | |
| DE | 102021121411 A1 * | 2/2023 | |
| EP | 3266651 B1 * | 11/2019 | ............ B60P 7/08 |
| FR | 3073377 A1 * | 5/2019 | ......... A47B 46/005 |
| JP | 2019010381 A * | 1/2019 | |
| KR | 20160140341 A * | 12/2016 | |

* cited by examiner

```
                                                              ┌─ 300
         ┌─ 305
┌─────────────────────────────────────────────────────────────────────┐
│ Removably coupling the connector of the first beam to a first track │
│ and thereby cantilevering the first beam into the open volume of    │
│ the shipping container, wherein the first track has a plurality of  │
│ openings disposed therein and arranged in series along a length of  │
│ the first track                                                     │
└─────────────────────────────────────────────────────────────────────┘
                                    │
         ┌─ 310                     ▼
┌─────────────────────────────────────────────────────────────────────┐
│ Removably coupling the connector of the second beam to either the   │
│ first track or a second track and thereby cantilevering the second  │
│ beam into the open volume of the shipping container, wherein the    │
│ second track has a plurality of openings disposed therein and       │
│ arranged in series along a length of the second track, wherein the  │
│ first track and the second track are each coupled to a first        │
│ sidewall of the shipping container such that the first and the      │
│ second tracks are arranged parallel to each other either            │
│ horizontally or vertically relative to a floor of the shipping      │
│ container, wherein the first beam and the second beam are arranged  │
│ at the same height in the shipping container to support the cargo   │
│ above the floor of the shipping container                           │
└─────────────────────────────────────────────────────────────────────┘
```

FIG. 16

```
         ┌─ 315
┌─────────────────────────────────────────────────────────────────────┐
│ Placing a pallet with the cargo on top of both the first beam and   │
│ the second beam                                                     │
└─────────────────────────────────────────────────────────────────────┘
                                    │
         ┌─ 320                     ▼
┌─────────────────────────────────────────────────────────────────────┐
│ Securing the cargo with at least one restraint or dunnage.          │
└─────────────────────────────────────────────────────────────────────┘
```

FIG. 17

```
         ┌─ 325
┌─────────────────────────────────────────────────────────────────────┐
│ Prior to removably coupling the connector of the first beam to the  │
│ first track, applying a force to the spring-biased blocking plate   │
│ and thereby moving the blocking plate to the second position to     │
│ permit the latching tab to enter a first opening in the first track │
└─────────────────────────────────────────────────────────────────────┘
                                    │
         ┌─ 330                     ▼
┌─────────────────────────────────────────────────────────────────────┐
│ Advancing the engagement notch to engage with the first edge of the │
│ of the first opening                                                │
└─────────────────────────────────────────────────────────────────────┘
                                    │
         ┌─ 335                     ▼
┌─────────────────────────────────────────────────────────────────────┐
│ Releasing the force applied to the blocking plate and thereby       │
│ permitting the blocking plate to move to the first position         │
└─────────────────────────────────────────────────────────────────────┘
```

FIG. 18

METHOD AND APPARATUS FOR INCREASING THE VOLUME OF MATERIALS TRANSPORTED IN A SHIPPING CONTAINER, TRUCK, AND/OR SEMI TRAILER

CROSS-REFERENCE TO RELATED APPLICATIONS

This U.S. Non-Provisional patent application claims the benefit of the filing date of U.S. Provisional Patent Application Ser. No. 63/074,387, filed Sep. 3, 2020, that is hereby incorporated by reference in its entirety.

TECHNICAL FIELD

The application is a United States provisional patent application of a method and apparatus for increasing the volume of materials, such as freight transported in a transportable shipping container, including a truck or semi-trailer equipped with a standard track on its interior, such as but not limited to E-Track made by Kinedyne, Ancra International, and ULINE.

BACKGROUND

It is known to place an upper pallet above a lower pallet, with the upper pallet being carried on long cross-beams that extend from one side of a shipping container to the other side, i.e., across the full-width of the floor of the container, trucks or semitrailer, with the cross-beam being held on tracks, such as E-Track or the like, disposed on opposite sides of the container, truck, or trailer. Some beam systems are disclosed in U.S. Pat. Nos. 5,807,047; 7,134,820; 6,824,341; 6,074,143; 5,338,137; 8,172,494; 8,740,526; 10,518,822, which are all incorporated by reference herein to the extent they are not contrary to the present disclosure.

While several styles of cross-beams have been used, and they have been vertically stacked one above the other, there are situations precluding use of the cross-beams. For example, oftentimes one side of the shipping container may have open unused volume, while the other side of the shipping container already contains a pallet load that extends vertically to a height that would block or prevent a cross-beam from extending across the open volume to engage the corresponding track on the opposite side. In this situation, that open volume remains empty or freight is directly stacked on other freight in an often unstable arrangement that may result in damage to the freight.

SUMMARY

The present disclosure offers a solution for the long-felt but unsolved need to provide a cargo support system to minimize unused cargo volume in a shipping container.

In a first aspect of the disclosure, a beam is described that is configured to be removably coupled to a track having a plurality of openings disposed therein and arranged in series along a length of the track. The track is coupled to a sidewall of a shipping container and thereby cantilevered to support cargo therein. The beam includes a housing extending between a first end and a second end of the beam, where the first end of the beam is configured to extend perpendicular from the sidewall and into an open volume of the shipping container. The beam also includes a bracket coupled to the second end of the beam, the bracket having an L-shaped flange with a horizontal leg and a vertical leg and a web extending therebetween, where the horizontal leg of the bracket is coupled to a bottom of the housing at the second end of the beam and the vertical leg of the bracket is configured to abut the track, when the track is arranged vertically, or to abut a spacer plate, when the track is arranged horizontally. The beam further includes a connector coupled to the second end of the beam and arranged above the bracket, where the connector has a front edge continuous with a bottom edge continuous with a back edge continuous with a top edge, where the bottom edge has an engagement notch configured to engage with a first edge of a first opening of the plurality of openings in the track and the top edge has a latching tab configured to extend through the first opening adjacent to a second edge of the first opening, wherein the connector is coupled to a latch having a spring-biased blocking plate configured to move from a first position arranged between the second edge of the first opening and the top edge of the connector to a second position out of the first opening and away from the latching tab.

In a second aspect of the disclosure, a system to support cargo is described. The system includes a shipping container. The system also includes a first plurality of tracks each having a plurality of openings disposed therein and arranged in series along a length of each track, where a first track and a second track are each coupled to a first sidewall of the shipping container such that the first and the second tracks are arranged vertically and parallel to each other relative to a floor of the shipping container. And the system includes a first beam and a second beam according to the first aspect of the disclosure, where the first beam is removably coupled to the first track and thereby cantilevered into an open volume of the shipping container, and where the second beam is removably coupled to the second track and thereby cantilevered into the open volume of the shipping container, where the first and the second beam are arranged at the same height in the shipping container to support the cargo above the floor of the shipping container.

In a third aspect of the disclosure, a system to support cargo is described. The system includes a shipping container. The system also includes a plurality of tracks each having a plurality of openings disposed therein and arranged in series along a length of each track, where a first track and a second track are each coupled to a sidewall of the shipping container such that the first track and the second track are arranged horizontally and parallel to each other relative to a floor of the shipping container. The system further includes a first beam and a second beam according to the first aspect of the disclosure, where the first beam and the second beam are both removably coupled to either the first track or the second track and thereby cantilevered into an open volume of the shipping container such that the first beam and the second beam are arranged at the same height in the shipping container to support the cargo above the floor of the shipping container.

In a fourth aspect of the disclosure, a method is described to support cargo in a shipping container using a first beam and a second beam according to the first aspect of the disclosure. The method includes removably coupling the connector of the first beam to a first track and thereby cantilevering the first beam into the open volume of the shipping container, where the first track has a plurality of openings disposed therein and arranged in series along a length of the first track. The method also includes removably coupling the connector of the second beam to a second track and thereby cantilevering the second beam into the open volume of the shipping container, wherein the second track has a plurality of openings disposed therein and arranged in series along a length of the second track, where the first track and the second track are each coupled to a first sidewall of the shipping container such that the first and the second tracks are arranged parallel to each other either horizontally or vertically relative to a floor of the shipping container, where the first beam and the second beam are arranged at the same height in the shipping container to support the cargo above the floor of the shipping container.

According to an exemplary embodiment of the present disclosure, beams are cantilevered into open cargo space above lower loads (i.e., freight or cargo) in a container, truck or trailer. The beams are connected to internal tracks on the sidewall of the container, truck or trailer such that the beams have a cantilevered arrangement. In various embodiments, the beams may advantageously be utilized with E-track already disposed in shipping containers that are part of known full-width cross beam systems. In operation, the beams support pallets carrying boxes or other cargo above the lower loads (i.e., freight or cargo). Unlike known full-width cross beams that extend across the entire span of a shipping container, the beams of the present disclosure extend only partially across the width of the container, truck or trailer. For example, the cantilever beams can extend half the width of the shipping container or less. As a result, the beams of the present disclosure provide more options to dock workers loading freight to utilize as much of the cubic space inside a shipping container as possible.

By using the beams of the present disclosure, instead of full-width cross-beams, more cargo can be fit into a shipping container as unused empty voids in the cargo-packing area are minimized. The beams advantageously permit a shelf or deck to be removably constructed at any height along the corresponding tracks, regardless of the profile of the freight arranged adjacent to the beams in the shipping container. The versatility of the beams thereby assists in filling any shipment voids. Increasing the usable volume of a given shipping container may correspondingly increase revenue per shipping container.

Further, known shipping processes and systems often result in rearranging of pallets with freight multiple times in an attempt to load the freight as securely and efficiently as possible, while also utilizing as much container space as possible. In addition, the beams of the present disclosure are lighter and less cumbersome to maneuver than the known full-width cross-beams. Here again, the versatility and modularity of the cantilever beams beneficially permit a shelf or deck to be built at any height at any location along the tracks in the shipping container. The technical effect is advantageously reduce the number of times the freight is rehandled. The reduction in rehandling may reduce damage to the freight and may also increase productivity at the dock.

The beams of the present disclosure may also beneficially protect a customer's freight, where the shelf or deck resulting from the placement of the beams creates an alternative to stacking freight on top of other freight. For example, in some instances, freight is stacked on top of other freight to utilize available space in a shipping container. Yet, in such an arrangement, the stability of the top skid of freight is reliant on the stability of the bottom skid of freight to ensure each skid remains fully intact and to avoid injury to a dock worker. Even when dunnage (e.g., bubble wrap, cardboard, foam, crinkle paper, air pillows, and/or kraft paper) is used, stacking freight on top of other freight leaves a customer's freight more susceptible to damage. In contrast, the beams of the present disclosure permit a user to configure a shelf or deck directly above the freight that would otherwise act as a stacking surface. And the beams can be placed and secured in a similar amount of time with a similar amount of effort as it would take for the user to place dunnage between and around the skids of stacked freight. In this advantageous arrangement, the top skid may be loaded onto the shelf of the beams, instead of onto the freight on the skid beneath the top skid, thereby avoiding potential damage to both the top and bottom skids.

In view of the foregoing, the beams of the present disclosure provide a shelf that may increase freight or cargo capacity, prevent damage to freight, reduce the cost of dunnage supplies, lessen fuel costs, increase productivity in dock loading zones, prevent or avoid injuries to dock workers, and allow for company growth by freeing up shipping capacity and resources.

Numerous other advantages and features of the present disclosure will be become readily apparent from the following detailed description and the accompanying drawings. The features, functions, and advantages that have been discussed can be achieved independently in various examples or may be combined in yet other examples further details of which can be seen with reference to the following description and drawings.

BRIEF DESCRIPTION OF THE DRAWINGS

FIG. 16 shows a flowchart of a method, according to one example implementation;

FIG. 17 shows a flowchart of an example method for use with the method of FIG. 16;

FIG. 18 shows a flowchart of an example method for use with the method of FIG. 16.

Figure 1:
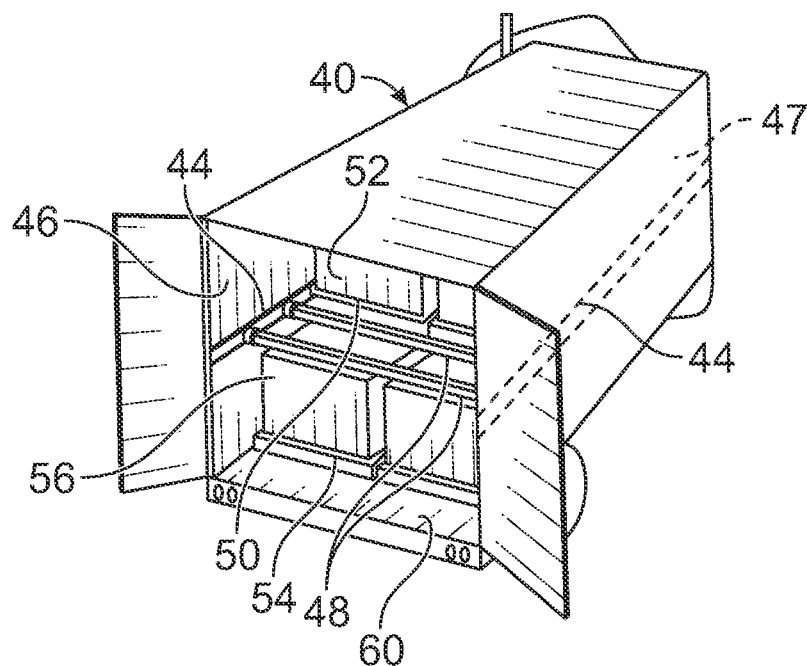
FIG. 1 is a schematic rear perspective view of a prior art semitrailer having rear doors open, the semitrailer having vertical beam racks spaced apart along a length of the semitrailer.

The drawings are provided for the purpose of illustrating examples, but it is understood that the examples are not limited to the arrangements and instrumentalities shown in the drawings.

DETAILED DESCRIPTION

While the present disclosure is susceptible of embodiment in many different forms, there are shown in the drawings, and will be described herein in detail, specific embodiments thereof with the understanding that the present disclosure is not intended to be limited to the specific embodiments illustrated herein.

FIG. 1 is a perspective drawing of the rear of a shipping container 40 in the form of semitrailer and tractor, having internal, horizontal tracks 44 on the interior sidewalls 46, 47 of the trailer and prior art full-width cross-beams 48 supported at opposite ends by being engaged to the horizontal tracks 44 to carry upper pallets 50 supported on the full-width cross-beams 48, the upper pallets supporting cargo 52. The full-width cross-beams 48 are located above lower pallets 54, the lower pallets supported on a trailer floor 60 and supporting cargo 56. The full-width cross-beams 48 have latching devices at opposite ends which engage selected slots in each horizontal track 44 and can be as described in U.S. Pat. Nos. 4,067,263; 6,895,867; and 5,807,047, herein incorporated by reference to the extent they are not contrary to the present disclosure.

Figure 2:
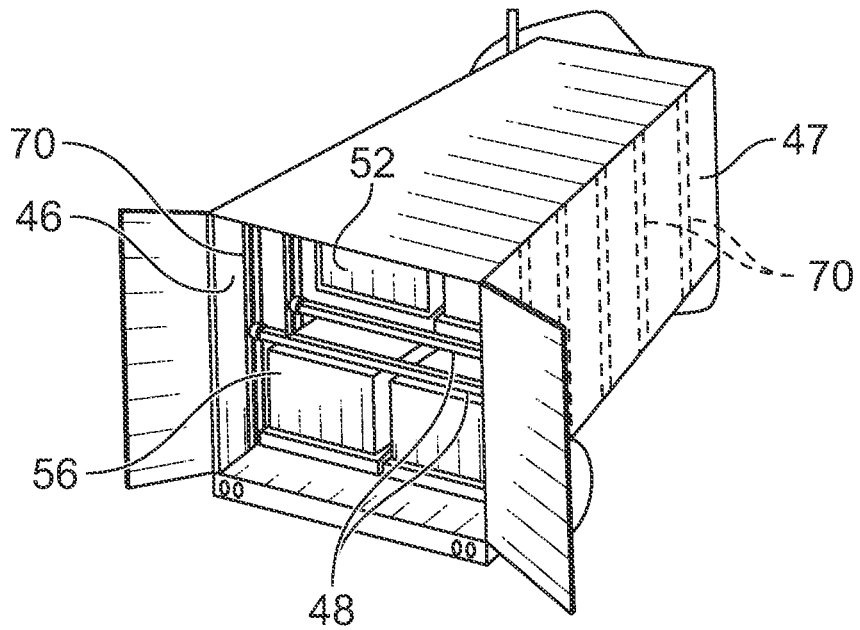
FIG. 2 is a schematic rear perspective view of a prior art semitrailer having rear doors open, the semitrailer having horizontal beam racks spaced apart along a height of the semitrailer.

FIG. 2 is a view of a prior art trailer similar to that shown on FIG. 1, but with vertical tracks 70 on the interior sidewalls 46, 47 that are orientated vertically instead of horizontally and spaced apart along a length of the trailer. The full-width cross-beams 48 are supported on opposite ends by the vertical tracks 70. The cross-beams 48 have latching devices at opposite ends which engage selected slots in each of the vertical tracks 70 and can be as described in U.S. Pat. Nos. 7,134,820; 6,824,341; 6,074,143; 5,338,137; 8,172,494; 8,740,526; and 10,518,822, herein incorporated by reference to the extent they are not contrary to the present disclosure.

Figure 3:
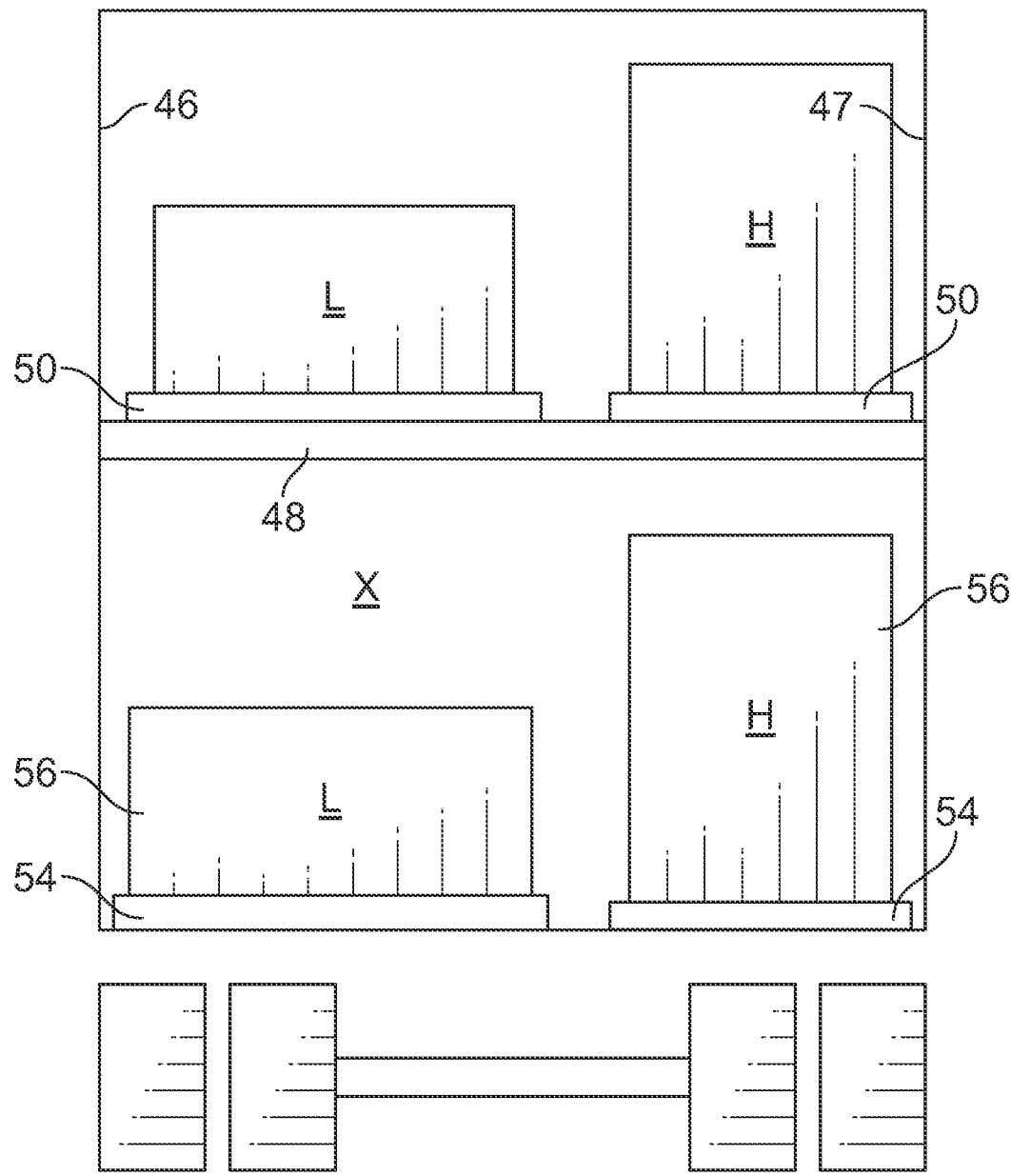
FIG. 3 is a schematic rear view of the semitrailer of FIG. 1, showing the loading arrangements of pallets.
Figure 5:
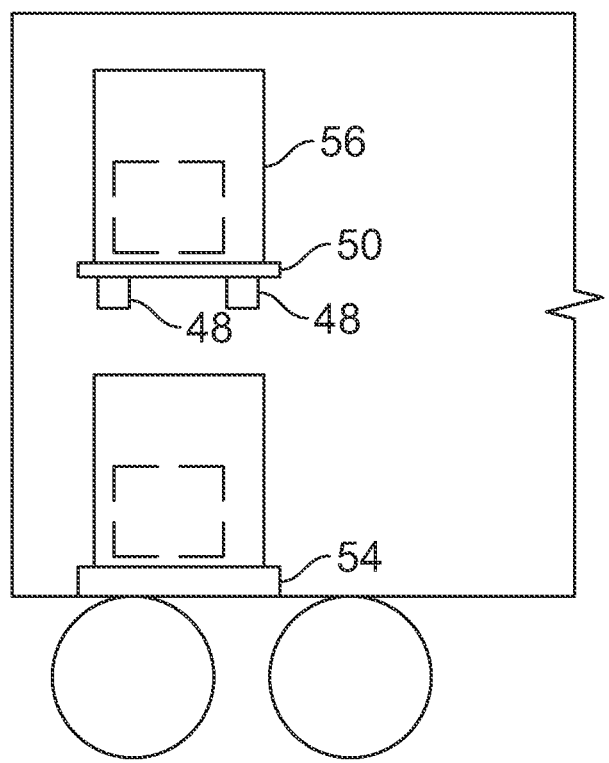
FIG. 5 is a schematic elevation view of the semitrailer of FIG. 1, showing the loading arrangements of pallets.

FIGS. 3 and 5 illustrate a schematic of a prior art arrangement utilizing a midlevel support cross-beam as shown in FIG. 1 or 2. In this prior art arrangement low height ("L") and high height ("H") pallet loads, such as boxes, may be loaded in the trailer showing vacant load volumes ("X") where no loads can be placed, even using prior art full-width cross-beams 48.

Figure 4:
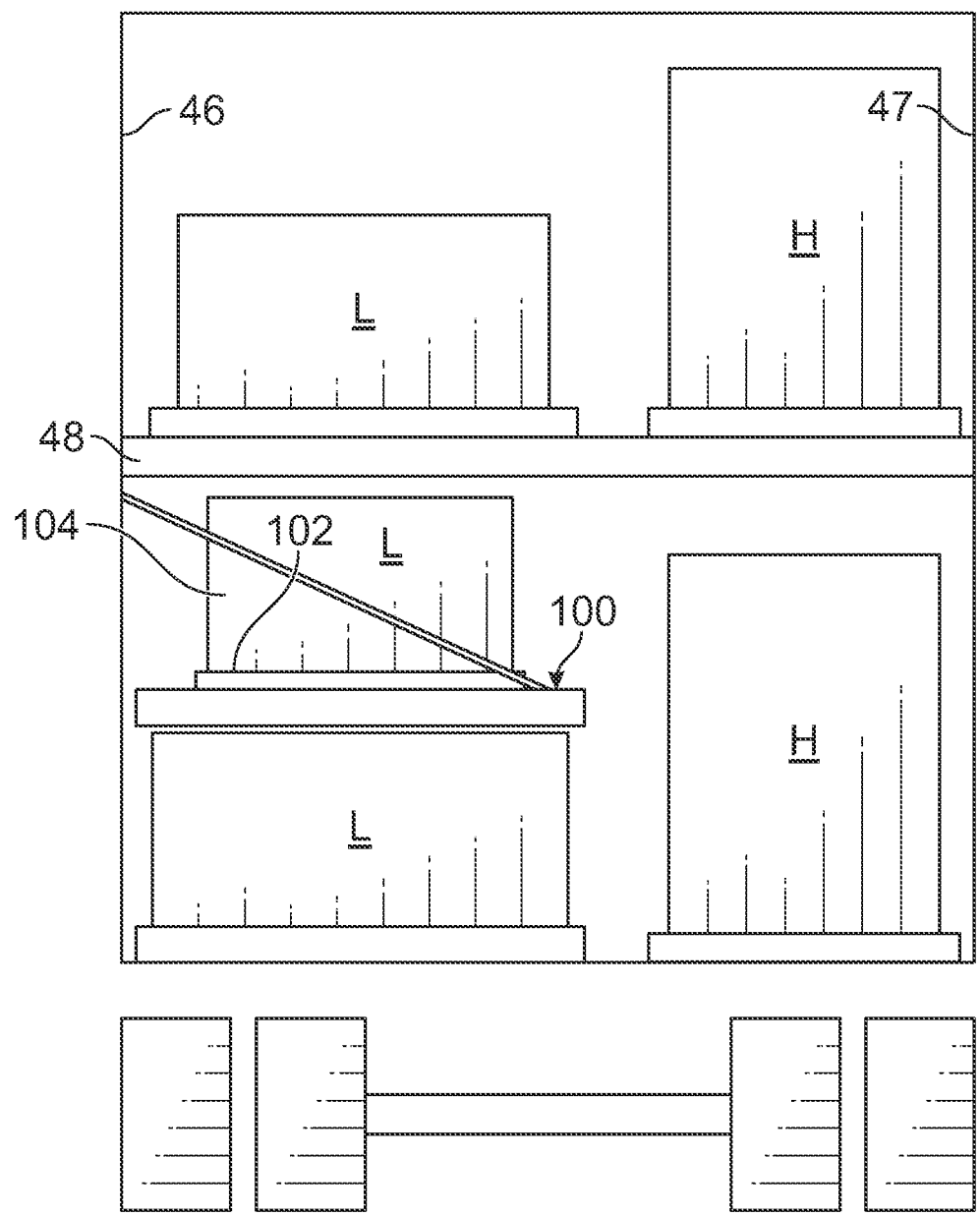
FIG. 4 is a schematic rear view of a semitrailer according to an example implementation of the beams and the system to support cargo.
Figure 6:
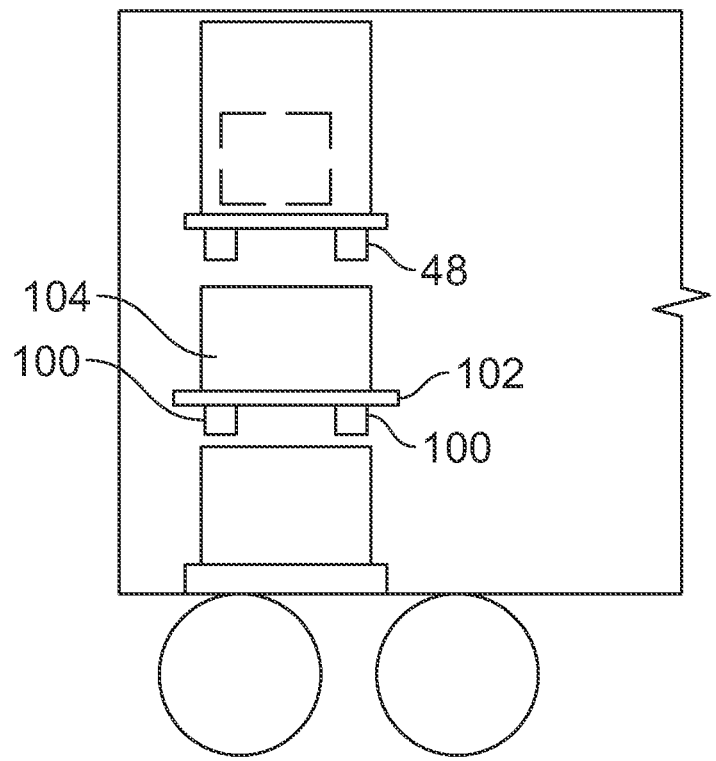
FIG. 6 is a schematic elevation view of the semitrailer of FIG. 4 according to an example implementation of the beams and the system to support cargo.

FIGS. 4 and 6 illustrate an advantage of the present disclosure. By using a system 100 in the form of a cantilever assembly employing the cantilevered beams 110 of the present disclosure, an additional level of pallet support can be utilized below the full-width cross-beam 48. The vacant load volume "X" has been utilized to load a pallet 102 carrying a load 104, such as a box, having a low height L.

Although for simplicity, only a rearmost cantilever assembly 100 is shown, but multiple cantilever assemblies can be utilized along the length of the trailer or other shipping container 40 to carry multiple pallets 102 carrying loads 104 of low height L (or high height H above low height L loads). Additionally, the system in the form of cantilever assemblies 100 can each be supported on tracks 44, 70 arranged along either sidewall 46, 47.

Figure 7:
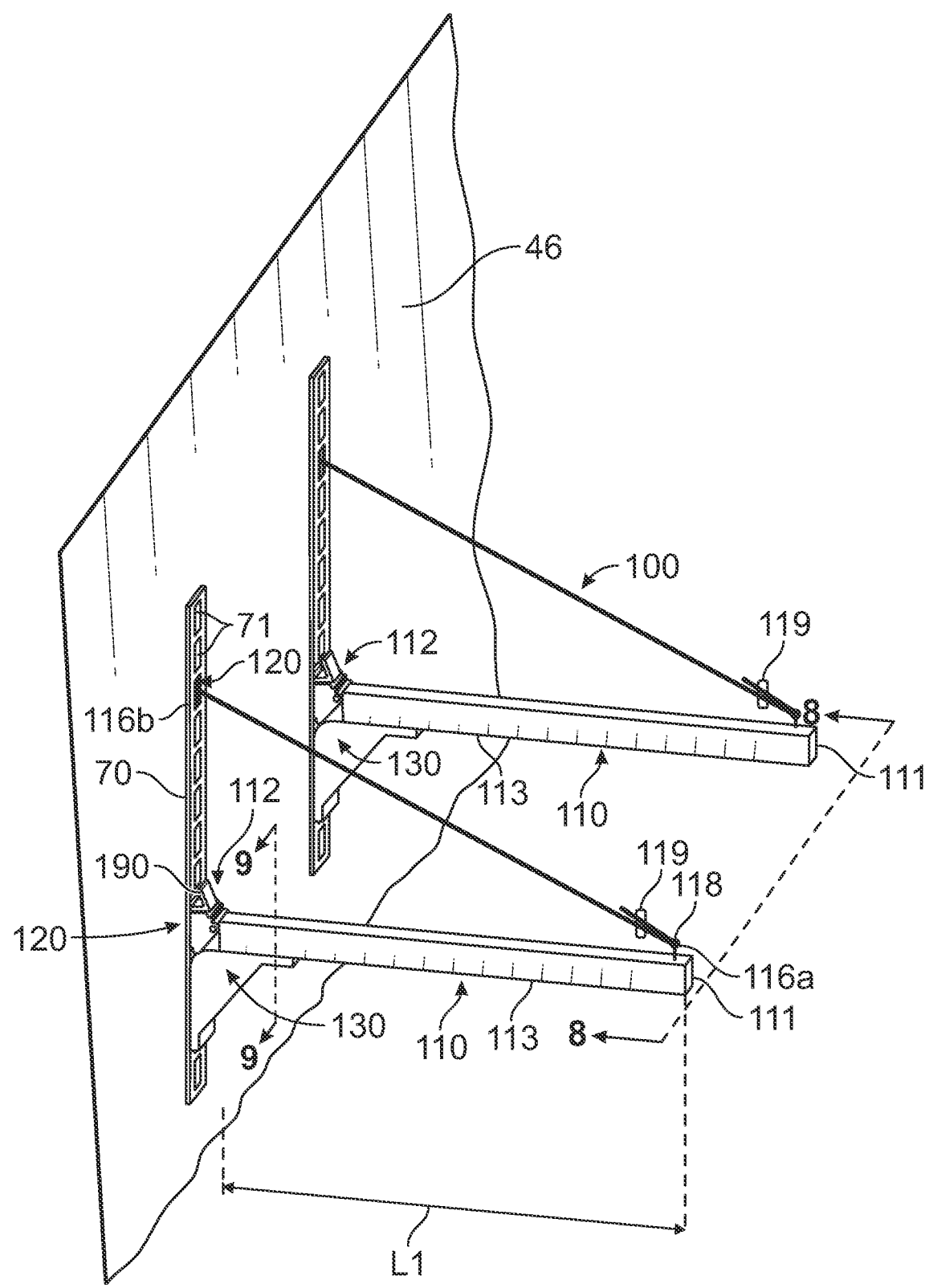
FIG. 7 is a fragmentary perspective view of the semitrailer of FIG. 4 illustrating an exemplary beam according to an example implementation.

FIG. 7 illustrates the system in the form of cantilever beam assemblies 100 in more detail. The system 100 includes one or more beams 110 according to a first aspect of the disclosure that are configured to be removably coupled to a track 70 having a plurality of openings 71 disposed therein and arranged in series along a length of the track 70. As shown, the track 70 is coupled to a sidewall 46 of a shipping container 40 and thereby cantilevered to support cargo therein. The vertical tracks 70 and can be as described in U.S. Pat. Nos. 7,134,820; 6,824,341; 6,074,143; 5,338,137; 8,172,494; 8,740,526; and 10,518,822, herein incorporated by reference to the extent they are not contrary to the present disclosure.

Each cantilever beam 110 is identical, so only one will be described. The beam 110 includes a housing 114 extending between a first end 111 and a second end 112 of the beam 110. In one implementation, the housing 114 has a rectangular or square cross-section. The first end 111 of the beam 110 is configured to extend perpendicular from the sidewall 46 and into an open volume 41 of the shipping container 40. In another implementation, the beam 110 is configured to extend into the open volume 41 a distance half the width of the shipping container 40. This arrangement has the technical effect of permitting the beam 110 and a cargo load 104 to be disposed adjacent to (i.e., directly across from) a cargo load having a height H in shipping container 40, as shown in FIG. 4.

Figure 9:
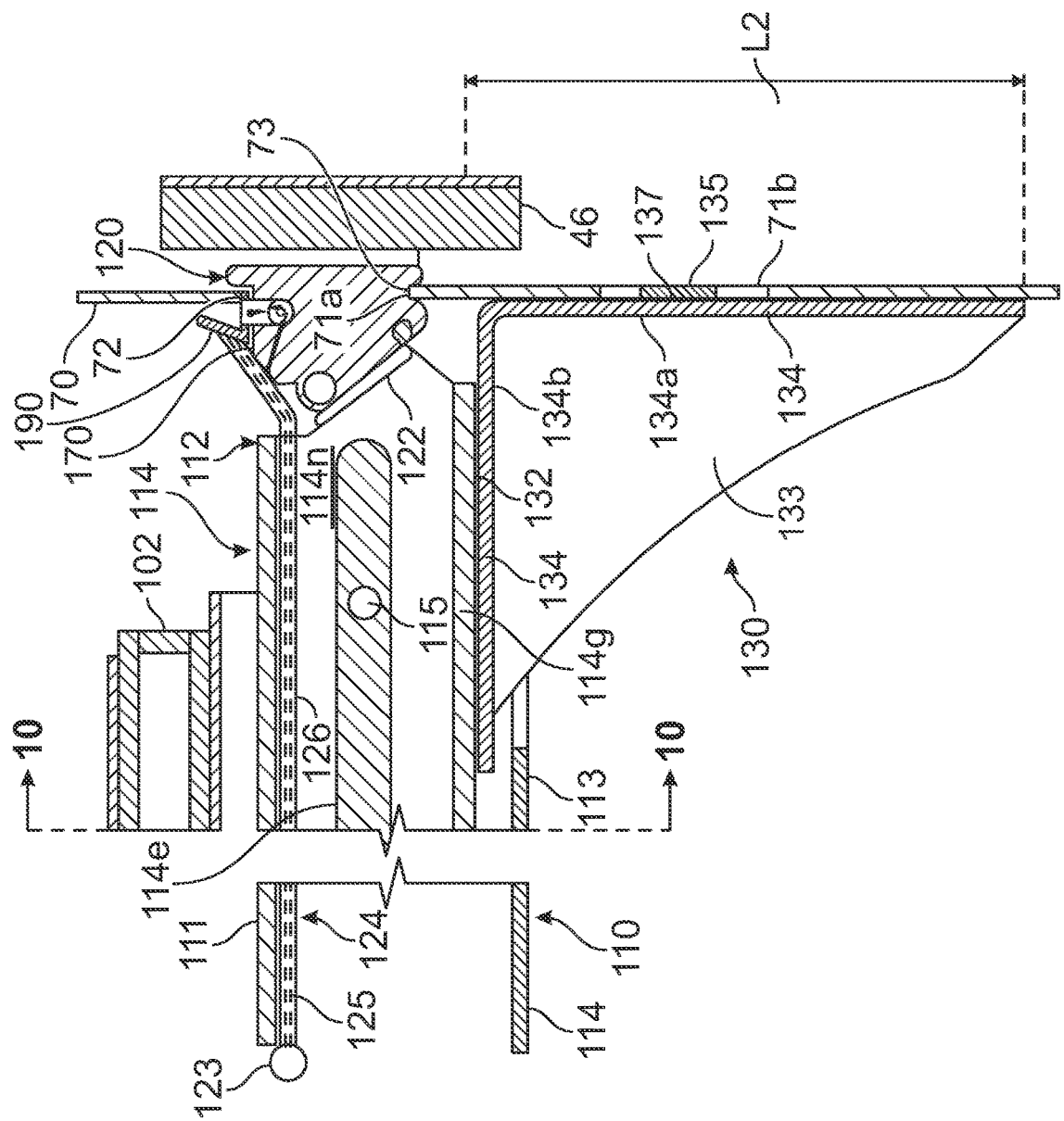
FIG. 9 is a fragmentary, enlarged side view of the beam taken from view 9-9 from FIG. 7, with portions removed to show underlying components.
Figure 10:
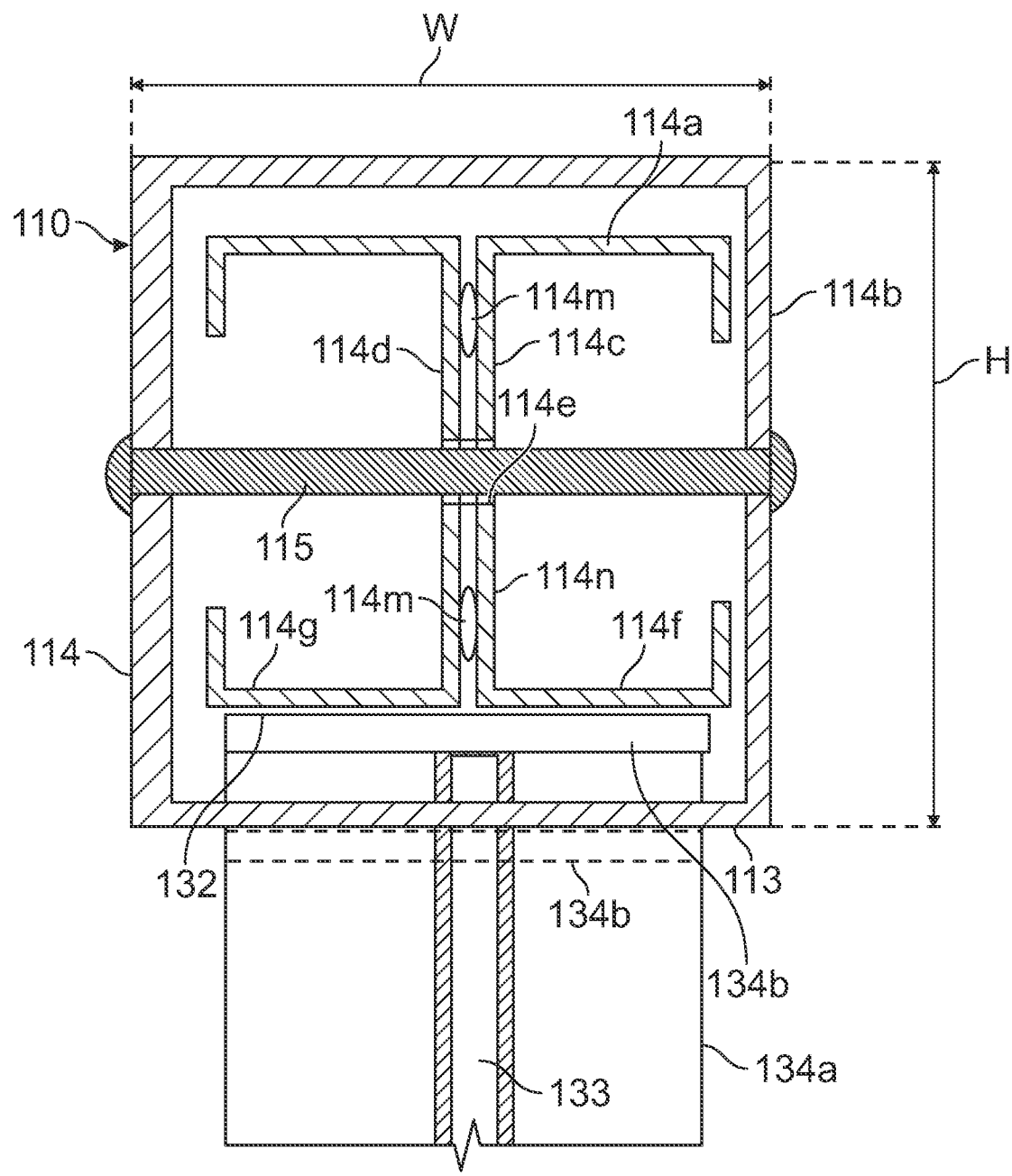
FIG. 10 is a sectional view taken generally through the plane 10-10 of FIG. 9, with the pallet removed.

FIG. 9 illustrates an optional implementation of the beam 110 in more detail. In this implementation, the beam's housing 114 comprises an inner rail 114a and an outer tube 114b that has a rectangular or square cross section and is slidable on the inner rail 114a. This configuration is described for example in U.S. Pat. Nos. 6,895,867; 5,807,047; 5,338,137, herein incorporated by reference to the extent it is not contrary to the present disclosure. The inner rail 114a comprises back-to-back channel members 114c, 114d fastened or welded together at 114m (FIG. 10). The rail 114a has a longitudinal slot 114e that receives a transverse fastener, a rivet or headed pin 115 that passes through the outer tube 114b and the inner rail 114a. The pin 115 guides sliding movement and relative position of the outer tube 114b with respect to the inner rail 114a, and provides a stop preventing complete separation of the outer tube 114a with the inner rail 114b. Alternative embodiments are contemplated that are static such that there is no slidable engagement between any internal support structure and the housing 114 of the beam 110.

According to one example implementation, the beam 110 has a length L1 of about 45 inches. The rectangular outer tube 114a has a width W of about 3 inches and a height H of about 2.5 inches. In one example implementation, the housing 114 of the beam is composed of steel. According to another example implementation, the rectangular outer tube 114a is composed of aluminum or other suitable material, and the inner rail 114b is composed of steel or other suitable material.

Figure 8:
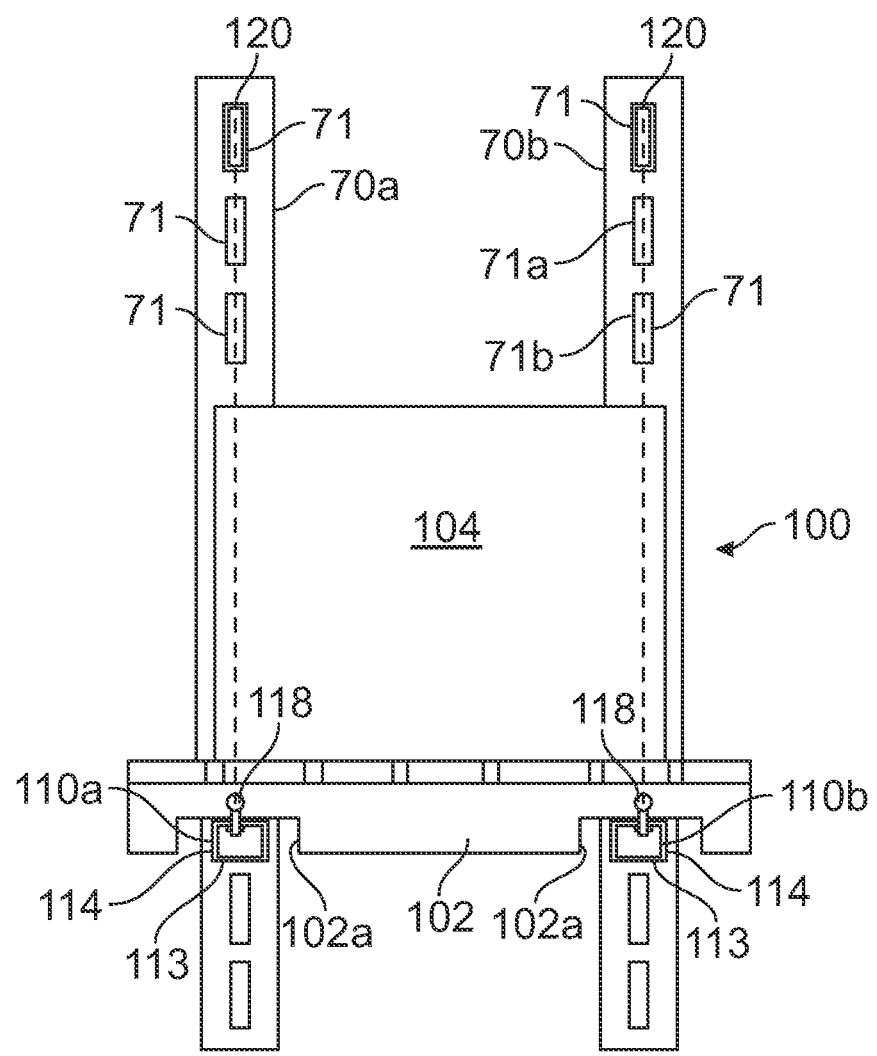
FIG. 8 is an end view of the beam taken generally from view 8-8 of FIG. 7.
Figure 13:
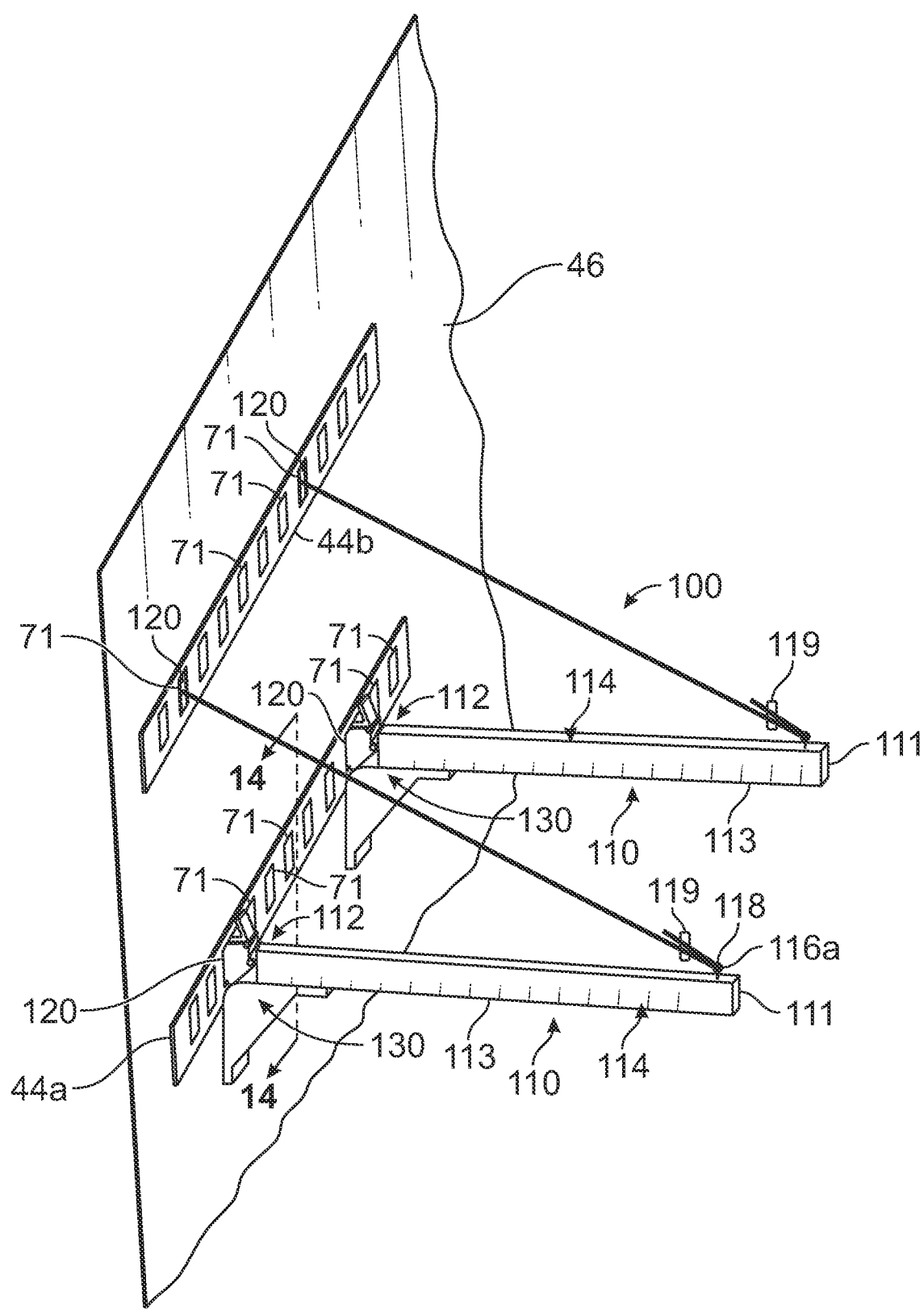
FIG. 13 is a fragmentary perspective view of the semitrailer of FIG. 4 illustrating an alternate beam system according to an example implementation.
Figure 14:
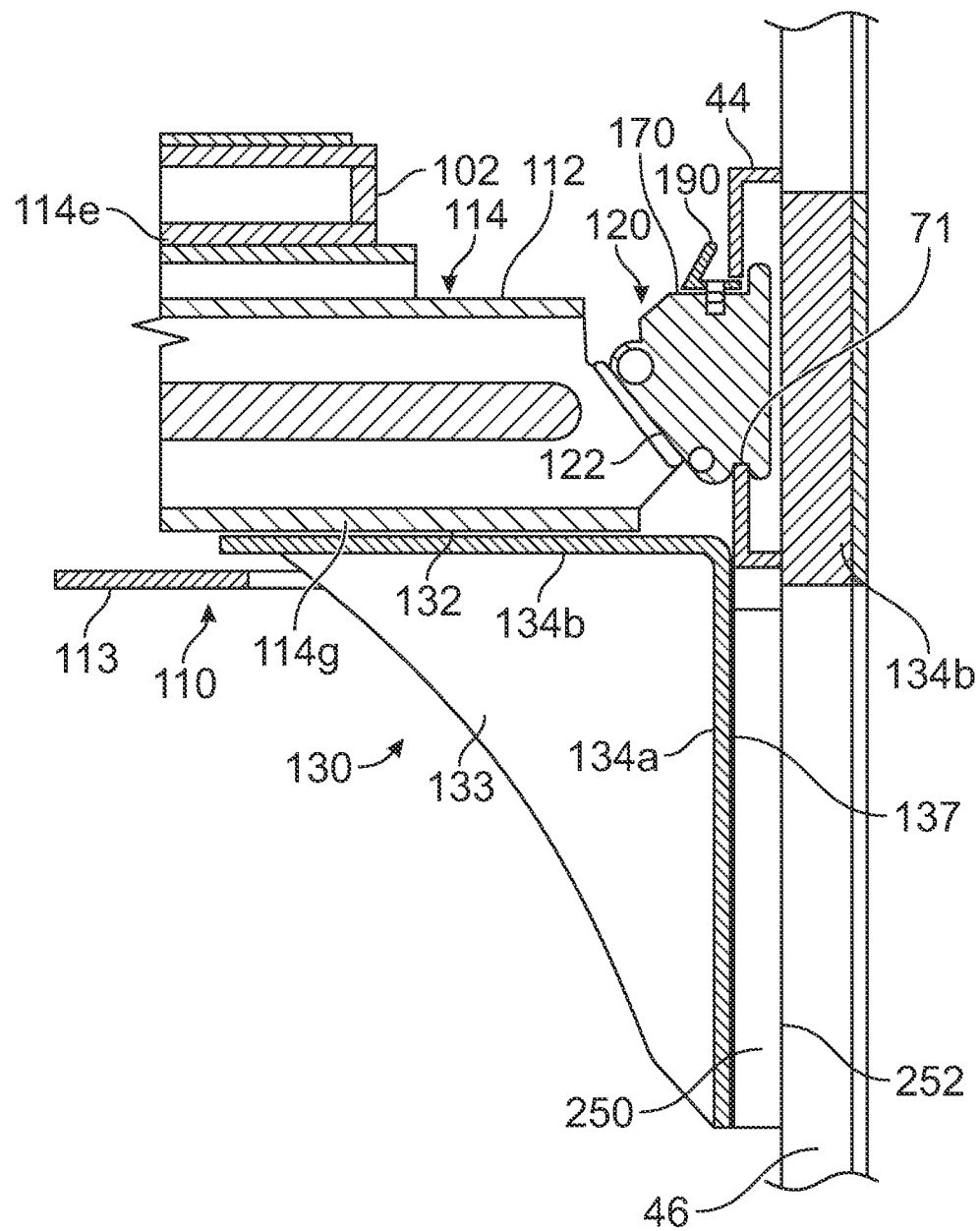
FIG. 14 is a fragmentary, enlarged side view of the beam system taken from view 14-14 of FIG. 13, with portions removed to show underlying components.

The beam further includes a bracket 130 coupled to the second end 112 of the beam 110. The bracket has an L-shaped flange 134 with a horizontal leg 134b and a vertical leg 134a and a web 133 extending therebetween. The horizontal leg 134b of the bracket 130 is coupled to a bottom 113 of the housing 114 at the second end 112 of the beam 110. The vertical leg 134a of the bracket 130 is configured to abut the track 70, when the track 70 is arranged vertically, as shown in FIGS. 7-9, or to abut a spacer plate 250, when the track 44 is arranged horizontally, as shown in FIGS. 13-14.

In one optional implementation, the web 133 is triangular shaped and welded all around to the L-shaped flange 134 of the bracket 130. In one optional implementation, the vertical leg 134a of the bracket 130 has a protrusion 135 configured to be disposed in a second opening 71b of the plurality of openings 71, when the track 70 is arranged vertically. Protrusion 135 has the technical effect of stabilizing any side-to-side movement of the bracket 130 during cargo loading or transportation of the shipping container 40. In another optional implementation, the beam 110 includes a spacer plate 250 coupled to the vertical leg 134a of the bracket 130, and the spacer plate 250 includes a damping material, when the track 44 is arranged horizontally. The damping material of the spacer plate 250 has the technical effect of minimizing vibration or bouncing of the beam 100 during cargo loading or transportation of the shipping container 40.

In one implementation, the horizontal leg 134b of the bracket 130 is coupled to an exterior surface of the bottom 113 of the housing 114. In one optional implementation, the horizontal leg 134b is welded all around, along weld lines 132 to bottom flanges 114f, 114g of the channel members 114c, 114d (FIG. 10) of the beam 110. The bracket 130 is positioned such that when the connector 120 is fully engaged to the track 70, the surface 137 of the vertical leg 134a presses against the track 70 (although it is shown slightly separated for clarity of depiction). In another optional implementation, the bracket 130 has a vertical length L2 of about 10 inches and a width of about 2 inches. And the bracket 130 is composed of steel or other suitable material.

The beam 110 further includes a connector 120 coupled to the second end 112 of the beam 110 and arranged above the bracket 130. The connector 120 has a front edge 160 continuous with a bottom edge 164 continuous with a back edge 166 continuous with a top edge 170. The bottom edge 164 has an engagement notch 174 configured to engage with a first edge 73 of a first opening 71a of the plurality of openings 71 in the track 70 and the top edge 170 has a latching tab 176 configured to extend through the first opening 71a adjacent to a second edge 72 of the first opening 71a. The connector 120 is coupled to a latch 180 having a spring-biased blocking plate 184 configured to move from a first position P1 arranged between the second edge 72 of the first opening 71a and the top edge 170 of the connector 120 to a second position P2 out of the first opening 71a and away from the latching tab 176. In one implementation, the blocking plate 184 is biased toward the first position P1 to maintain the beam 110 in a locked condition within an opening 71 of the track 70.

In one optional implementation, the inner rail 114a of beam 110 has a web 114n that is welded by a weld line 122, or otherwise coupled to the connector 120, at the second end 112 of the beam 110.

Figure 11:
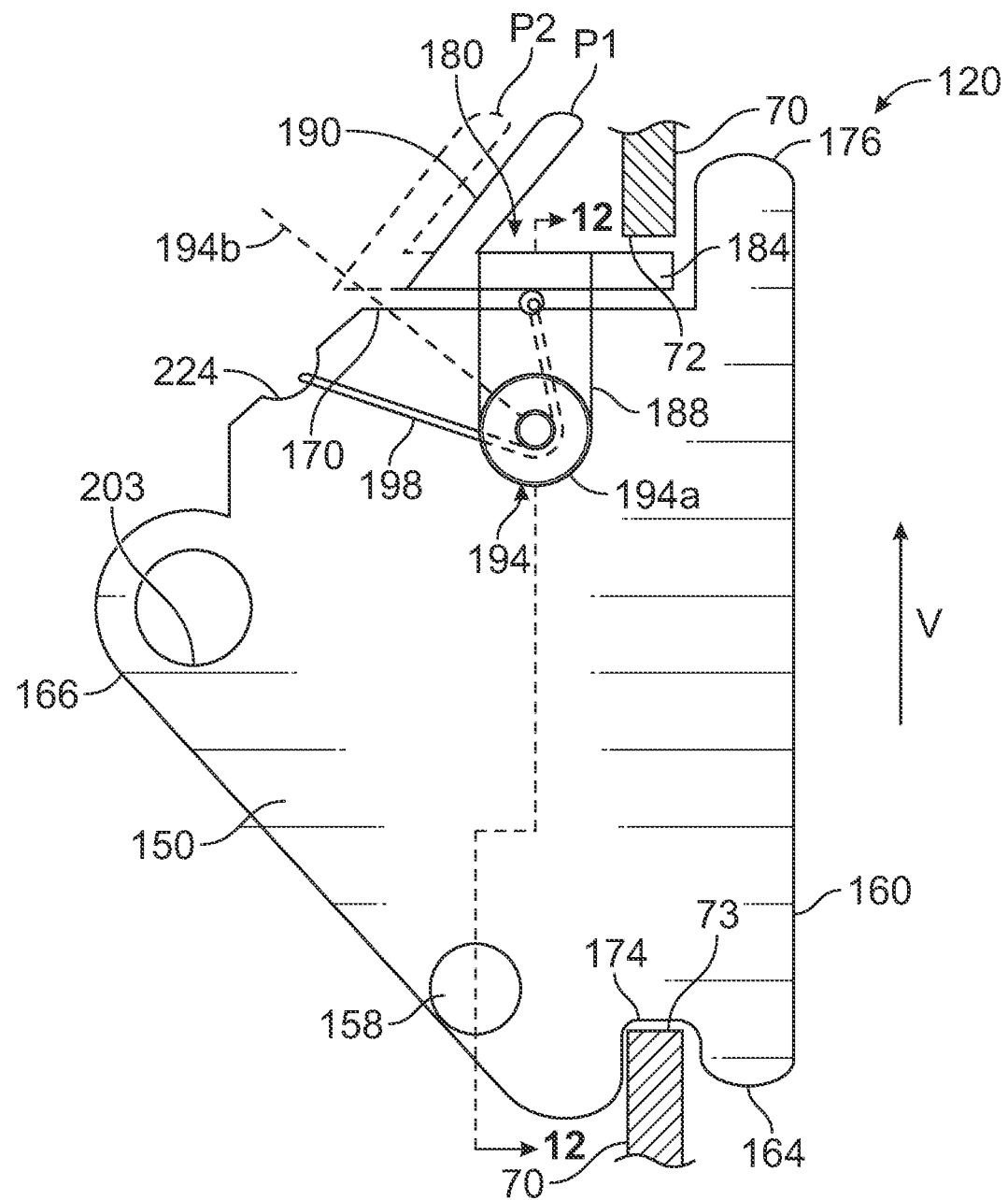
FIG. 11 is an enlarged side view of a latching portion taken from FIG. 9.

In another implementation, as shown in FIGS. 9 and 11, the connector includes a finger tab 190 coupled to the spring-biased blocking plate 184, and the finger tab 190 is angled toward the latching tab 176. The technical effect of the finger tab arrangement is to avoid a pallet 102 or cargo load 104 obstructing movement between the first position P1 and the second position P2.

In a further implementation, as shown in FIG. 9, the beam 110 includes a pull-tab 123 arranged at the first end 111 of the housing 114, and a Bowden cable 124 having an inner cable 125 configured to move relative to an outer conduit 126. The Bowden cable 124 extends through the housing 114 and has a first end 111 coupled to the pull-tab 123 and a second end 112 coupled to the spring-biased blocking plate 184. The Bowden cable is a flexible cable used to transmit mechanical force to the spring-biased blocking plate 184 by movement of the inner cable (e.g., steel or stainless steel) relative to the outer conduit 126 (i.e., a cable housing, typically plastic). The technical effect of the Bowden cable 124 and pull-tab 123 arrangement is to permit a dock worker, for example, to move the spring-biased blocking plate 184 between the first position P1 and the second position P2 to facilitate placement of the beam 110 in the track 70 or removal therefrom while standing in a remote position relative to the sidewall 46 and connector 120. This may be useful, for example, when cargo adjacent to or beneath a given beam 110 prevents easy access to the finger tab 190 at the second end 112 of the beam 110.

In one optional embodiment, shown in FIGS. 7-8, a tension element 116, such as a wire, cable, or rope can be used to add support to the beam 110 if needed. According to one embodiment a steel stranded cable 116 may be used. The cable is attached at first end 116a to the beam member 114 and at an opposite, second end 116b to the track 70 or another fixture on the sidewall 46. The cable 116 is oriented at an oblique angle, such as 45 degrees. The cable 116 is attached to the beam member at the first end 116a by looping through an eyebolt 118 and closing the resulting loop with a U-bolt style cable clamp 119. The base 112 and the second end 116b of the cable are attached to the track 70 using a connector 120 described below.

Figure 12:
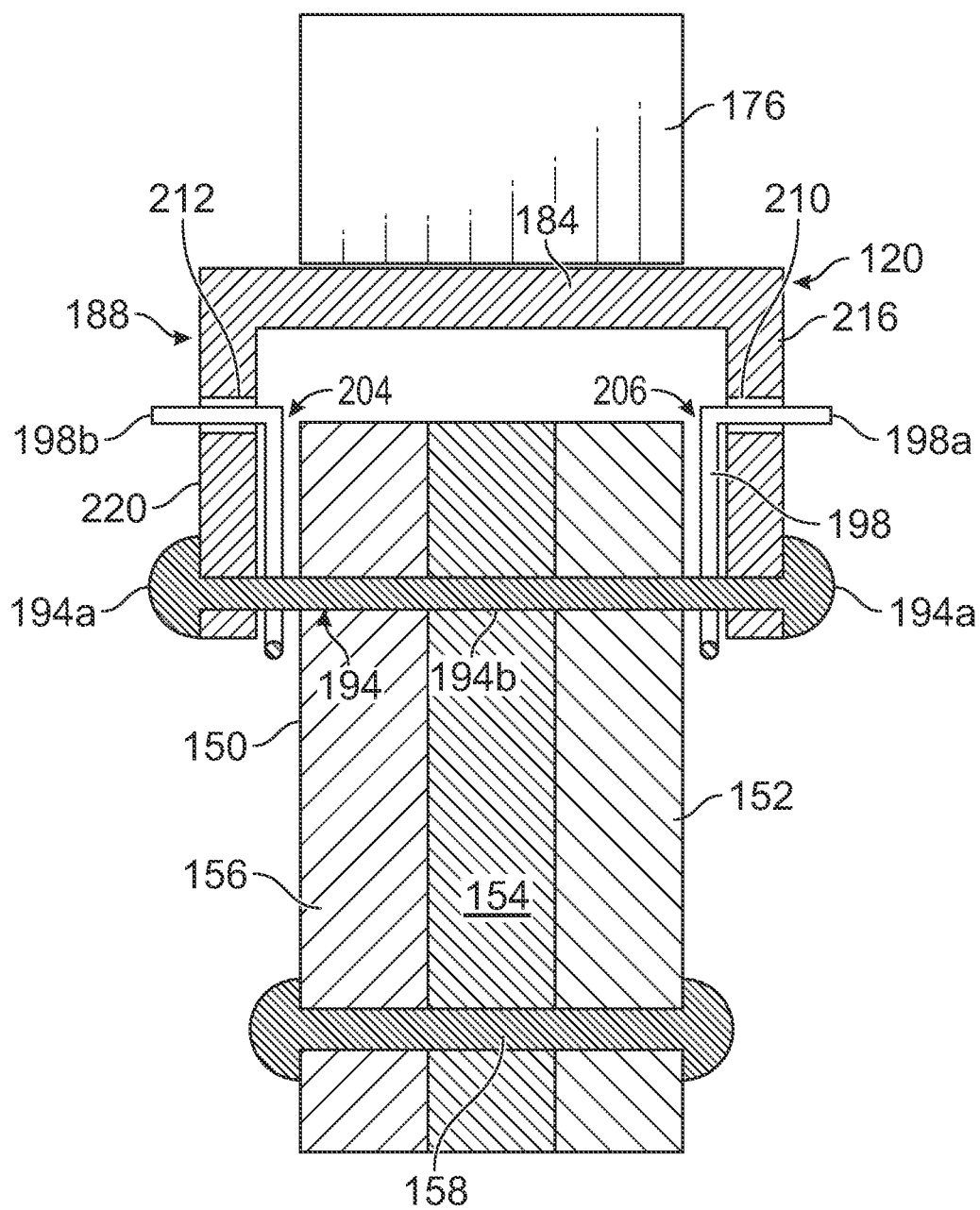
FIG. 12 is a sectional view taken generally through plane 12-12 of FIG. 11.
Figure 12A:
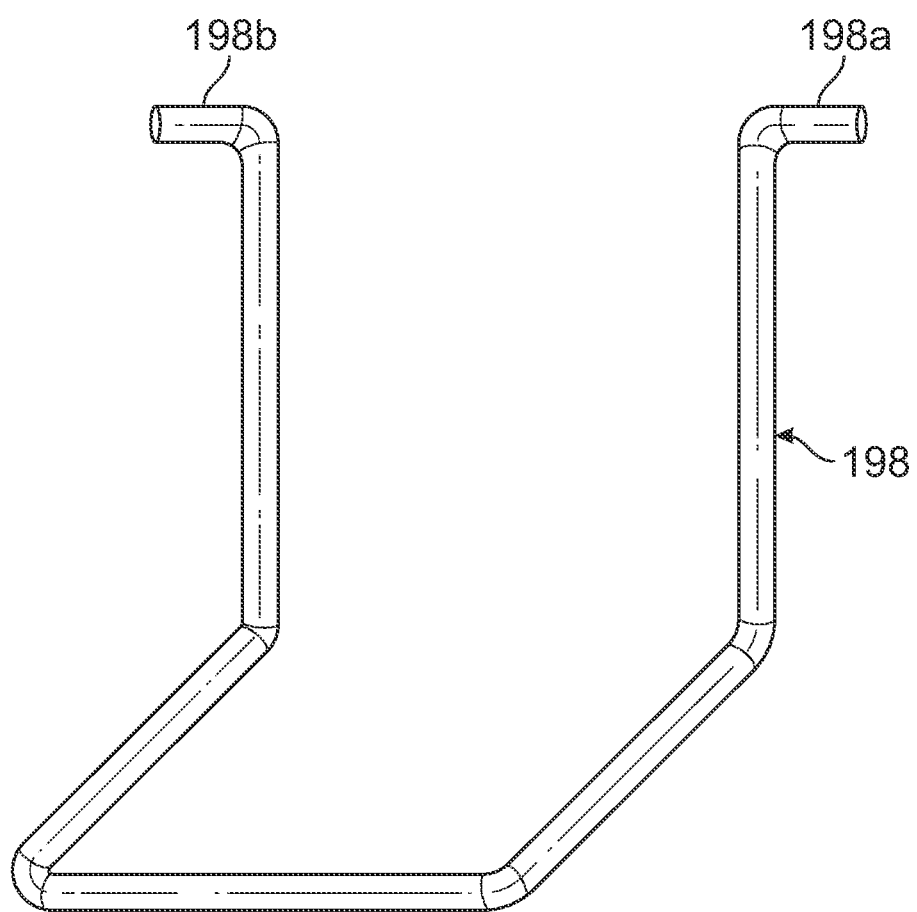
FIG. 12A is a perspective view of a spring element taken from FIG. 11.

FIGS. 11-12 illustrate an optional implementation of the connector 120 in greater detail. Although several types of connectors are described that are compatible with the track 70 described herein, there are other types of connectors and tracks that would work as well. Some of these connectors and tracks are described in U.S. Pat. Nos. 5,807,047; 7,134,820; 6,824,341; 6,074,143; 5,338,137; 8,172,494; 8,740,526, which are all incorporated by reference herein to the extent they are not contrary to the present disclosure.

In this optional implementation, the connector 120 includes a body 150 having three plates 152, 154, 156 of identical shape welded or otherwise coupled together, via one or more headed pins 158. The body 150 includes a front edge 160 continuous with a bottom edge 164 continuous with a back edge 166, continuous with a top edge 170. The bottom edge includes an engagement notch 174 and the top edge includes a latching tab 176. A latch 180 is positioned at a top region of the body 150. The latch 180 includes a blocking plate 184 connected to a yoke 188 that straddles the body 150 and is connected to a finger tab 190. The latch 180 includes a bent wire spring 198. The yoke 188 is pivotally connected to the body 150 by a rivet or headed pin 194, for example, having opposite heads 194a and a connecting shaft 194b. The yoke 188 has opposite legs 216, 220 spaced from the body 150 by front and back gaps 204, 206 and the bent wire spring 198 fits within these gaps 204, 206.

The bent wire spring 198 includes oppositely-directed engagement end portions 198a, 198b that extend through holes 210, 212 in the opposite legs 216, 220 of the yoke 188. The spring 198 wraps around the headed pin 194 on opposite sides of the body 150 and extends across the back edge 166 of the body 150, fitting into a spring notch 224 on the back edge 166 of the body 150.

The spring 198 urges the yoke 188 to turn clockwise in the orientation shown in FIG. 11 to move the spring-biased blocking plate 184 between the top edge 170 of the body 150 and a top edge 72 of the opening 71*a*, arranged as a slot, in the track 70, in the position shown in FIG. 10. When a user applies force to the finger tab 190 in a direction away from the track 70, the yoke 188 rotates counterclockwise in the orientation of FIG. 11 to move the blocking plate 184 out from between the top edge 72 of the slot 71 and the top edge 170 of the body 150. In this position, the connector 120 can be vertically lifted in opening or slot 71*a*, in the direction V, to a distance required for a bottom edge 73 of the opening or slot 71*a* to clear the engagement notch 174 for the connector 120 to be disengaged from the track 70.

In one example implementation, the connector 120 includes an aperture 203 that can be used to attach a tension element 116 to the connector 120, such as a wire, cable or rope if needed. For example, in one optional implementation, a braided cable can be looped through the aperture 203 and closed with a U-bolt style cable clamp 119.

FIGS. 13 and 14 illustrate the system for a cantilever beam assembly 100 mounted to horizontal tracks 44. The horizontal track 44 can be as described in U.S. Pat. Nos. 4,067,263; 6,895,867; and 5,807,047, herein incorporated by reference to the extent they are not contrary to the present disclosure. The beam 110 mounts to the first horizontal track 44 by a connector 120 coupled to a vertical opening or slot 71 in the track 44, as previously described with respect to the vertical track 70 above. In this arrangement, a spacer plate 250 is arranged between the surface 137 of the bracket 130 and the sidewall 46. The spacer plate can be approximately the same width and height as the vertical leg 134*a* of the bracket 130 and can be welded to the vertical leg 134*a*. A surface 252 of the spacer plate 250 bears against the sidewall 46 when a load is supported by the beam 110. In an optional implementation, the cable 116 is attached at the first end 116*a* by the eyebolt 118, as previously described, and at a second end to a connector 120 that engages a slot of a second horizontal track 44*b* arranged above the first horizontal track 44*a*, as previously described.

Figure 15:
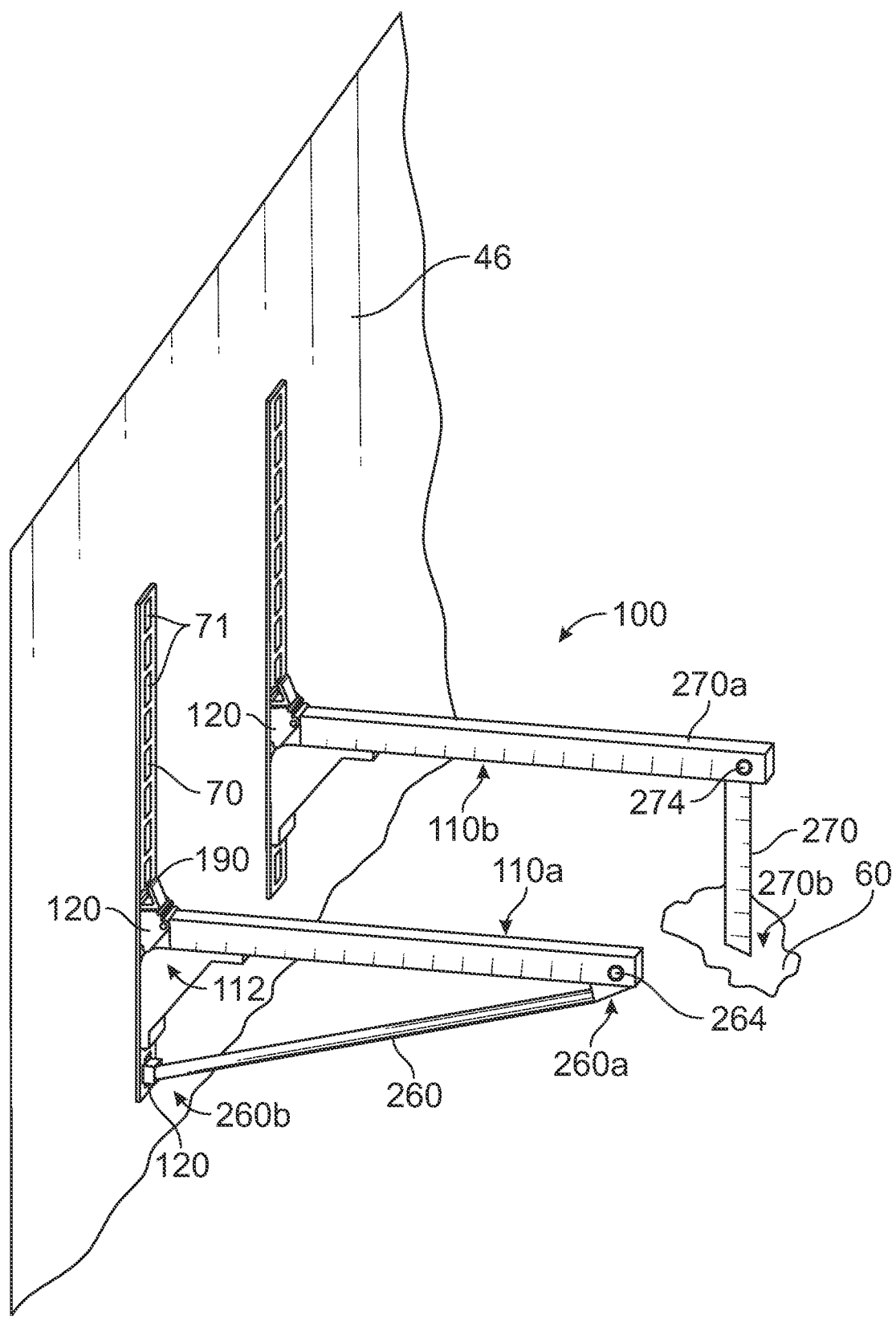
FIG. 15 is a fragmentary perspective view of the semi-trailer of FIG. 4 illustrating further alternate example implementations of the beams.

FIG. 15 illustrates two alternative optional implementations of the beam 110. In the foreground of FIG. 15, a system in the form of a cantilever assembly 100*a* is identical to the previously described cantilever assembly 100 except the cable 116 is replaced by a rigid knee brace 260 beneath the beam 110*a* in the form of a metal angle iron or rectangular cross-section tube. The knee brace is connected by a pin 264 or like device at a first end 260*a*, and to a connector 120, as previously described, at a second end 260*b*, and is arranged at an oblique angle, such as 45 degrees. The connector 120 can be removably engaged to a selected opening or slot 71 in the track 70.

In the background of FIG. 15, a further alternate system in the form of cantilever beam assembly 100*b* is identical to the cantilever beam assembly 100 except the cantilever beam 110 is supported at a distal end by a column 270 in the form of a metal angle iron or rectangular cross section tube. The column is fastened at a top end 270*a* to the beam 110*b* by a pin or other fastener 274, and rests on the floor 60 at a bottom end 270*b*.

Although FIG. 15 illustrates two different cantilever beam assembly configurations it is to be understood that both cantilever beams assemblies could be identically configured, such as shown in FIG. 7.

Although vertical and horizontal tracks are described, diagonal tracks could also be used. Still further, wall assemblies with a plurality of slots disposed therein and arranged in series may be used in place of tracks.

Although some embodiments use a cable to support an end of the cantilever beam, the cable could be replaced by a rigid element, such as a bar, angle iron or tube. And the beams may be used in the absence of any other support.

Although the various cantilever embodiments are described above as being attached to the sidewall 46, they could also be attached to the sidewall 47. Two cantilever beams 110 could be attached to opposite walls 46, 47 and aligned transversely and a connector, such as a telescopic connector, could be used to attach the two beams together to form a single beam that extends transversely across the trailer.

A second aspect of the disclosure, shown in FIG. 8, provides a system 100 to support cargo 104 that includes a shipping container 40. Although the present disclosure has been described with respect to semitrailers, a variety of shipping containers are contemplated, including those for use with other wheeled-vehicles, ships, and trains.

The system 100 further includes a first plurality of tracks 70 each having a plurality of openings 71 disposed therein and arranged in series along a length of each track 70. A first track 70*a* and a second track 70*b* are each coupled to a first sidewall 46 of the shipping container 40 such that the first and the second tracks 70*a*, 70*b* are arranged vertically and parallel to each other relative to a floor 60 of the shipping container 40. In this example implementation, the plurality of tracks 70 have a spaced apart arrangement along a length of the shipping container.

The system 100 also includes a first beam 110*a* and a second beam 110*b* as described above with respect to the first aspect of the disclosure. The first beam 110*a* is removably coupled to the first track 70*a* and thereby cantilevered into an open volume of the shipping container 40. And the second beam 110*b* is removably coupled to the second track 70*b* and thereby cantilevered into the open volume of the shipping container 40. The first and the second beam 110*a*, 110*b* are arranged at the same height in the shipping container 40 to support the cargo 104 above the floor of the shipping container 40. In one optional implementation, the first beam 110*a* and the second beam 110*b* each extend into the open volume a distance half the width of the shipping container 40.

FIG. 8 illustrates the pallet 102 being supported on the first and second beams 110*a*, 110*b* of system 100, as described above with respect to the first aspect of the disclosure. As shown, the pallet 102 has notched areas 102*a*, 102*b* to fit over and accommodate the beams 110*a*, 110*b*. Cargo 104 is disposed on pallet 102.

In one optional implementation, the system 100 further includes a second plurality of tracks each having a plurality of openings disposed therein and arranged in series along a length of each track. The second plurality of tracks are each coupled to a second sidewall 47 of the shipping container 40 such that the second plurality of tracks are arranged vertically and parallel to each other relative to a floor 60 of the shipping container 40.

An alternative system 100 to support cargo 104 according to the second aspect of the disclosure, includes a shipping container 40, as described above.

This alternative system 100 also includes a first plurality of tracks 44 each having a plurality of openings 71 disposed therein and arranged in series along a length of each track 44. A first track 44*a* and a second track 44*b* are each coupled to a sidewall 46 of the shipping container 40 such that the first track 44*a* and the second track 44*b* are arranged horizontally and parallel to each other relative to a floor 60 of the shipping container 40. In this example implementation, the plurality of tracks 44 have a spaced apart arrangement along a height of the shipping container 40.

The alternative system 100 also includes a first beam 110a and a second beam 110b according to the first aspect of the disclosure. The first beam 110a and the second beam 110b are both removably coupled to either the first track 44a or the second track 44b and thereby cantilevered into an open volume of the shipping container 40 such that the first beam 110a and the second beam 110b are arranged at the same height in the shipping container 40 to support the cargo 104 above the floor of the shipping container 60.

In one optional implementation, the first beam 110a and the second beam 110b each extend into the open volume a distance half the width of the shipping container 40.

In one optional implementation, the alternative system 100 also includes a second plurality of tracks each having a plurality of openings disposed therein and arranged in series along a length of each track. The second plurality of tracks are each coupled to a second sidewall 47 of the shipping container 40 such that the second plurality of tracks are arranged horizontally and parallel to each other relative to a floor 60 of the shipping container 40.

FIG. 16 shows a flowchart of an example method 300 to support cargo 104 in a shipping container 40 using a first beam 110a and a second beam 110b according to the first aspect of the disclosure. Method 300 shown in FIG. 16 presents an example of a method that could be used with the system 100, according to the second aspect of the disclosure, for example. Method 300 includes, at block 305, removably coupling the connector 120 of the first beam 110a to a first track 70a, 44a and thereby cantilevering the first beam 110a into the open volume of the shipping container 40. The first track 70a, 44a has a plurality of openings disposed therein and arranged in series along a length of the first track 70a, 44a. Then, at block 310, the connector 120 of the second beam 110b is removably coupled to either the first track 44a or to a second track 70b and thereby cantilevers the second beam 110b into the open volume of the shipping container 40. The second track 70b has a plurality of openings 71 disposed therein and arranged in series along a length of the second track 70b. The first track 70a, 44a and the second track 70b are each coupled to a first sidewall 46 of the shipping container 40 such that the first and the second tracks 70a, 44a, 70b are arranged parallel to each other either horizontally or vertically relative to a floor of the shipping container 40. The first beam 110a and the second beam 110b are arranged at the same height in the shipping container 40 to support the cargo 104 above the floor 60 of the shipping container 40.

In one optional implementation, shown in FIG. 17, method 300 includes, at block 315, placing a pallet with the cargo 104 on top of both the first beam 110a and the second beam 110b. Then, at block 320, the cargo 104 is secured with at least one restraint or dunnage. For example, dunnage may take the form of bubble wrap, cardboard, foam, crinkle paper, air pillows, and/or kraft paper.

In one optional implementation, shown in FIG. 18, method 300 includes, at block 325, applying a force to the spring-biased blocking plate 184 and thereby moving the blocking plate 184 to the second position P2 to permit the latching tab 176 to enter a first opening 71a in the first track 44a, 70a, prior to removably coupling the connector 120 of the first beam 110a to the first track 44a, 70a. Next, at block 330, the engagement notch 174 is advanced to engage with the first edge 73 of the of the first opening 71a. Then, at block 335, the force applied to the blocking plate 184 is released thereby permitting the blocking plate 184 to move to the first position P1. The same actions may be taken with respect to the second beam 110b.

Figure 19:
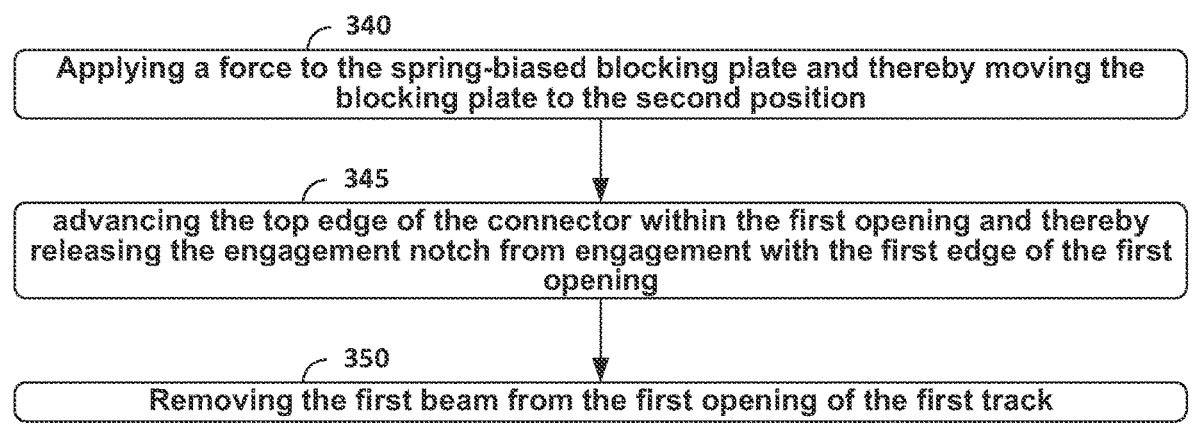
FIG. 19 shows a flowchart of an example method for use with the method of FIG. 16.

In one optional implementation, shown in FIG. 19, method 300 includes, at block 340, applying a force to the spring-biased blocking plate 184 and thereby moving the blocking plate 184 to the second position P2. Next, at block 345, the top edge 170 of the connector 120 advances within the first opening 71a thereby releasing the engagement notch 174 from engagement with the first edge 73 of the first opening 71. Then, at block 350, the first beam 110a is removed from the first opening 71a of the first track 44a, 70a. The same actions may be taken with respect to the second beam 110b.

From the foregoing, it will be observed that numerous variations and modifications may be put into effect without departing from the spirit and scope of the invention. It is to be understood that no limitation with respect to the specific apparatus illustrated herein is intended or should be inferred. The description of the different advantageous arrangements has been presented for purposes of illustration and description and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

The invention claimed is:

1. A beam configured to be removably coupled to a track having a plurality of openings disposed therein and arranged in series along a length of the track, the track coupled to a sidewall of a shipping container and thereby cantilevered to support cargo therein, the beam comprising:

a housing extending between a first end and a second end of the beam, wherein the first end of the beam is configured to extend perpendicular from the sidewall and into an open volume of the shipping container;

a bracket coupled to the second end of the beam, the bracket having an L-shaped flange with a horizontal leg and a vertical leg and a web extending therebetween, wherein the horizontal leg of the bracket is coupled to a bottom of the housing at the second end of the beam and the vertical leg of the bracket is configured to abut the track, when the track is arranged vertically, or to abut a spacer plate, when the track is arranged horizontally; and a connector coupled to the second end of the beam and arranged above the bracket, wherein the connector has a front edge continuous with a bottom edge continuous with a back edge continuous with a top edge, wherein the bottom edge has an engagement notch configured to engage with a first edge of a first opening of the plurality of openings in the track and the top edge has a latching tab configured to extend through the first opening adjacent to a second edge of the first opening, wherein the connector is coupled to a latch having a spring-biased blocking plate configured to move from a first position arranged between the second edge of the first opening and the top edge of the connector to a second position out of the first opening and away from the latching tab.

2. The beam of claim 1, wherein the housing has a rectangular or a square cross-section.

3. The beam of claim 1, wherein the blocking plate is biased toward the first position.

4. The beam of claim 1, further comprising a finger tab coupled to the spring-biased blocking plate, wherein the finger tab is angled toward the latching tab.

5. The beam of claim 1, further comprising:
   a pull-tab arranged at the first end of the housing; and
   a Bowden cable having an inner cable configured to move relative to an outer conduit, the Bowden cable extending through the housing and having a first end coupled to the pull-tab and a second end coupled to the spring-biased blocking plate.

6. The beam of claim 1, wherein the beam is configured to extend into the open volume a distance half the width of the shipping container.

7. The beam of claim 1, wherein the vertical leg of the bracket has a protrusion configured to be disposed in a second opening of the plurality of openings, when the track is arranged vertically.

8. The beam of claim 1, further comprising the spacer plate coupled to the vertical leg of the bracket, wherein the spacer plate comprises a damping material.

9. A system to support cargo, comprising:
   a shipping container;
   a first plurality of tracks each having a plurality of openings disposed therein and arranged in series along a length of each track, wherein a first track and a second track are each coupled to a first sidewall of the shipping container such that the first and the second tracks are arranged vertically and parallel to each other relative to a floor of the shipping container; and
   a first beam and a second beam according to claim 1, wherein the first beam is removably coupled to the first track and thereby cantilevered into an open volume of the shipping container, and wherein the second beam is removably coupled to the second track and thereby cantilevered into the open volume of the shipping container, wherein the first and the second beam are arranged at the same height in the shipping container to support the cargo above the floor of the shipping container.

10. The system of claim 9, wherein the first beam and the second beam each extend into the open volume a distance half the width of the shipping container.

11. The system of claim 9, wherein the plurality of tracks have a spaced apart arrangement along a length of the shipping container.

12. The system of claim 9, further comprising a second plurality of tracks each having a plurality of openings disposed therein and arranged in series along a length of each track, wherein the second plurality of tracks are each coupled to a second sidewall of the shipping container such that the second plurality of tracks are arranged vertically and parallel to each other relative to a floor of the shipping container.

13. A system to support cargo, comprising:
   a shipping container;
   a first plurality of tracks each having a plurality of openings disposed therein and arranged in series along a length of each track, wherein a first track and a second track are each coupled to a sidewall of the shipping container such that the first track and the second track are arranged horizontally and parallel to each other relative to a floor of the shipping container; and
   a first beam and a second beam according to claim 1, wherein the first beam and the second beam are both removably coupled to either the first track or the second track and thereby cantilevered into an open volume of the shipping container such that the first beam and the second beam are arranged at the same height in the shipping container to support the cargo above the floor of the shipping container.

14. The system of claim 13, wherein the first beam and the second beam each extend into the open volume a distance half the width of the shipping container.

15. The system of claim 13, wherein the plurality of tracks have a spaced apart arrangement along a height of the shipping container.

16. The system of claim 13, further comprising a second plurality of tracks each having a plurality of openings disposed therein and arranged in series along a length of each track, wherein the second plurality of tracks are each coupled to a second sidewall of the shipping container such that the second plurality of tracks are arranged horizontally and parallel to each other relative to a floor of the shipping container.

17. A method to support cargo in a shipping container using a first beam and a second beam each according to claim 1, comprising:
   removably coupling the connector of the first beam to a first opening in a first track and thereby cantilevering the first beam into the open volume of the shipping container, wherein the first track has a plurality of openings disposed therein and arranged in series along a length of the first track; and
   removably coupling the connector of the second beam to either the first track or to a second track and thereby cantilevering the second beam into the open volume of the shipping container, wherein the second track has a plurality of openings disposed therein and arranged in series along a length of the second track, wherein the first track and the second track are each coupled to a first sidewall of the shipping container such that the first and the second tracks are arranged parallel to each other either horizontally or vertically relative to a floor of the shipping container, wherein the first beam and the second beam are arranged at the same height in the shipping container to support the cargo above the floor of the shipping container.

18. The method of claim 17, further comprising:
   placing a pallet with the cargo on top of both the first beam and the second beam; and
   securing the cargo with at least one restraint or dunnage.

19. The method of claim 17, further comprising:
   prior to removably coupling the connector of the first beam to the first track, applying a force to the spring-biased blocking plate and thereby moving the blocking plate to the second position to permit the latching tab to enter a first opening in the first track;
   advancing the engagement notch to engage with the first edge of the of the first opening; and
   releasing the force applied to the blocking plate and thereby permitting the blocking plate to move to the first position.

20. The method of claim 19, further comprising:
   applying a force to the spring-biased blocking plate and thereby moving the blocking plate to the second position;

advancing the top edge of the connector within the first opening and thereby releasing the engagement notch from engagement with the first edge of the first opening; and removing the first beam from the first opening of the first track.

\* \* \* \* \*